United States Patent [19]

Kawamura

[11] Patent Number: 4,776,167
[45] Date of Patent: Oct. 11, 1988

[54] TURBO-SUPERCHARGER FOR INTERNAL COMBUSTION ENGINE

[75] Inventor: Hideo Kawamura, Kanagawa, Japan

[73] Assignee: Isuzu Motors Ltd., Japan

[21] Appl. No.: 920,456

[22] Filed: Oct. 20, 1986

[30] Foreign Application Priority Data

Oct. 22, 1985 [JP] Japan ................ 60-236045

[51] Int. Cl.⁴ .................................. F02B 37/12
[52] U.S. Cl. .......................... 60/602; 29/156.8 R; 415/177; 415/205
[58] Field of Search ............. 60/605, 602; 415/177, 415/196, 197, 204, 205; 29/156.8 R, 156.8 CF

[56] References Cited

U.S. PATENT DOCUMENTS 4,122,673  10/1978  Leins ............................ 60/605
4,384,821   5/1983  Mains et al. ................ 415/205 X

FOREIGN PATENT DOCUMENTS 8306  1/1975  Japan ........................ 60/602
138222  8/1983  Japan ........................ 60/602
 10709  1/1984  Japan ........................ 415/177

Primary Examiner—Michael Koczo
Attorney, Agent, or Firm—John E. Toupal; Harold G. Jarcho

[57] ABSTRACT

An internal combustion engine turbo-supercharger including a turbine disc; a cast turbine housing defining an inlet for connection to an engine exhaust manifold, an exhaust port for discharging exhaust gases, a turbine chamber enclosing the turbine disc, and a convoluted passage extending between the inlet and the periphery of the turbine disc; an individual metallic partition plate disposed in the housing and separating the convoluted passage into first and second passages each providing communication between the inlet and the periphery of the turbine disc; and a valve disposed in the first passage and operable to control flow therethrough.

4 Claims, 1 Drawing Sheet

TURBO-SUPERCHARGER FOR INTERNAL COMBUSTION ENGINE

BACKGROUND OF THE INVENTION

The present invention relates to a turbo-supercharger for an internal combustion engine.

For turbo-superchargers commonly used with internal combustion engines, the flow rate of exhaust air at low engine speed generally is insufficient resulting in less than satisfactory performance. More specifically, the ratio $P_2/P_1$ between inlet pressure and outlet pressure with respect to the flow rate of exhaust gas to the turbo-supercharger varies as shown in FIG. 4. Since the efficiency of a supercharger's turbine is expressed by $n=1-(P_1/P_2)^{K-1/K}$, the ratio of inlet pressure and outlet pressure substantially affects efficiency with increased inlet pressure providing increased turbine efficiency. Accordingly, for internal combustion engines exhibiting large variations in exhaust gas flow rates, it is very difficult to effectively utilize exhaust energy for intake supercharging when using a single turbine.

Laid-Open Japanese Utility Model Application No. 114844/1983 discloses an arrangement wherein a turbine disc possesses both a low-speed disc and a high-speed disc disposed internally and externally, respectively. In addition, exhaust air flow to the turbine is controlled by a valve which interrupts flow to the high-speed disc when the flow rate of exhaust gas is small. Although improving efficiency, the aforesaid arrangement is relatively complicated in construction and high in cost. Moreover, a partitioning wall for separating passages connected to the high-speed and low-speed turbine discs is cast integral with a turbine housing resulting in a partition of undesirably great wall thickness. Consequently, if a heat insulating material is mounted on these internal wall surfaces, the passages become unduly narrowed.

The object of the present invention, therefore, is to provide a turbo-supercharger which is small in size, provides high efficiency and can be easily manufactured.

SUMMARY OF THE INVENTION

The invention is an internal combustion engine turbo-supercharger including a turbine disc; a cast turbine housing defining an inlet for connection to an engine exhaust manifold, an exhaust port for discharging exhaust gases, a turbine chamber enclosing the turbine disc, and a convoluted passage extending between the inlet and the periphery of the turbine disc; an individual metallic partition plate disposed in the housing and separating the convoluted passage into first and second passages each providing communication between the inlet and the periphery of the turbine disc; and a valve disposed in the first passage and operable to control flow therethrough. The use of a non-cast individual partition plate permits a significant reduction in the size of the supercharger.

According to specific features of the invention, the partition plate is cast into the turbine housing and has a thickness substantially less than the walls of the housing defining the convoluted passage. Casting the partition plate in the housing simplifies construction and the narrow thickness thereof improves efficiency.

According to other features, the invention includes a metallic thermal insulation plate cast into the turbine housing and lining the inner surfaces thereof. The insulation plate further enhances efficiency of the supercharger.

According to yet another feature of the invention, the partition plate and the insulation plate are integrally connected before being cast into the turbine housing. This arrangement further simplifies constuction of the device.

According to still other features, the supercharger includes a sensor for sensing the pressure at the inlet, and electrical controls coupled to the valve and the sensor and operative to control the valve in response to the pressure at the inlet.

The invention additionally encompasses a method for producing an internal combustion engine turbo-supercharger comprising the steps of forming a casting mold for a turbine housing defining an inlet, an exhaust port, a turbine chamber, and a convoluted passage extending between the inlet and the chamber; disposing a partition plate in the casting mold in a position to separate the convoluted passage into first and second passages each providing communication between the inlet and the chamber; casting the turbine housing with the partition plate as an integral unit; mounting a turbine disc in the turbine chamber; and mounting a valve in the first passage. This method provides in a simple manner the desired device.

According to another feature, the inventive method includes the step of disposing a thermal insulation plate in the casting mold in a position to cover the inner surfaces of the walls defining the convoluted passage; and casting the turbine housing, the partition plate and the insulation plate as an integral unit.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENT

Figure 1:
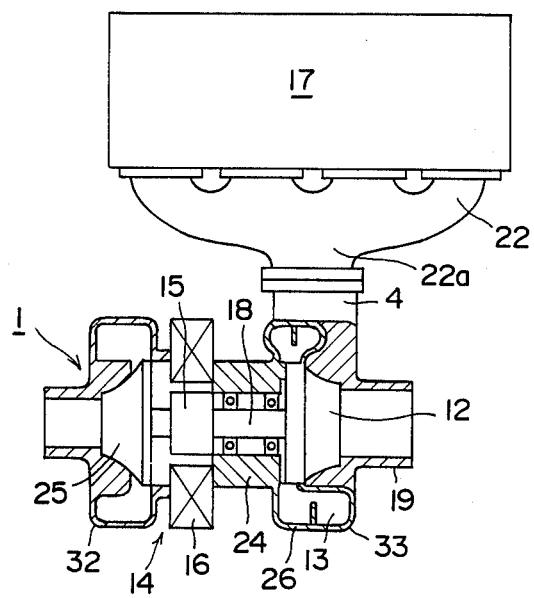
FIG. 1 is a plan view in cross-section of a turbo-supercharger according to the present invention.

As shown in FIG. 1, a turbo-supercharger 1 has a turbine housing 26 with a scroll-shaped portion 4 defining an inlet connected to a collecting pipe 22a of an exhaust manifold 22 of an internal combustion engine 17. In the turbo-supercharger 1, a turbine 33 and a blower 32 are coupled to opposite ends, respectively, of a casing 24. Within a turbine chamber of the housing 26 is a turbine disc 12 coupled to one end of a shaft 18 supported by bearings on the casing 24. A blower disc 25 is coupled to an opposite end of the shaft 18. Also coupled to the shaft 18 is a rotor 15 of a generator 14, and a stator 16 encircling the rotor 15 is coupled to the casing 24. The scroll portion 4 of the turbine housing 26 defines a convoluted passage providing communication between the periphery of the turbine disc 12 and the collecting pipe 22a. Separating the convoluted passage within the scroll portion 4 into first and second spiral passages a and b, respectively, is a partition plate 6 within the turbine housing 26. The passages a and b extend from the inlet of the housing portion 4 and include annular chambers 13a, 13b, respectively, surrounding the turbine disc 12.

Exhaust gases from the exhaust manifold 22 enter chambers 13a, 13b through the scroll portion 4 and impinge upon to induce rotation of the turbine disc 12 and then are discharged through an exhaust port 19. The blower disc 25 along with the shaft 18 are rotated and driven by the turbine disc 12 to effect intake supercharging in the normal manner.

Figure 2:
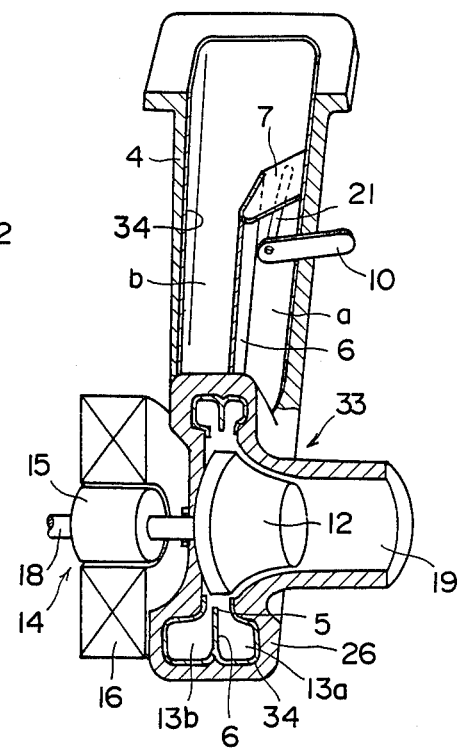
FIG. 2 is a perspective view with essential parts of the turbo-supercharger shown in section.
Figure 3:
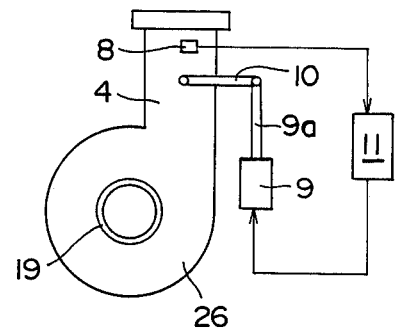
FIG. 3 is a side view of the same.

According to the present invention and as shown in FIG. 2, the partitioning plate 6 is formed from heat-resisting metal such as stainless steel and a control valve 7 is disposed in the first scroll passage a. A lever 10 is coupled to a shaft 21 of the valve 7 and is driven by an electromagnetic actuator 9 as shown in FIG. 3. Receiving an electric signal from a pressure sensor 8 provided at the inlet of the scroll portion 4 is an electronic controller 11. When inlet pressure diminishes to below a predetermined value, the electromagnetic actuator 9 is excited by an output signal of the controller 11 and a rod 9a thereof is extended to close the valve 7 and thereby the first scroll passage a. The valve 7 is configured so as to close the first passage a in a state inclined to the flow of exhaust gases thereby minimizing the resistance to exhaust air flow through the second passage b.

An exposed portion of the partitioning plate 6 extends into the turbine housing 26 and encircles the periphery of the turbine disc 12 to define the chambers 13a and 13b. Preferably, a peripheral portion of the partitioning plate 6 is inserted into a casting mold and cast in situ with the turbine housing 26. In addition, a heat-insulating metal plate 34 such as stainless steel, is provided to cover and thermally insulate the interior wall surfaces of the turbine housing 26 and thereby reduce the loss of exhaust heat. Preferably, the partitioning plate 6 and the insulating plate 34 first are integrally connected, combined with a casting core, set in a casting mold, and then cast into the housing 26 so as to constitute an integral unit therewith.

With the turbo-supercharger constructed as described above, the electromagnetic actuator 9 is driven by an electric signal from the electronic controller 11 in response to an input signal produced by the pressure sensor 8. When the rotational speed (r.p.m.) of the engine is high and the exhaust volume large, the inlet pressure also is high, and the rod 9a of the actuator 9 is extended by a return spring (not shown) to open the valve 7 and the first passage a. Thus, exhaust gases flow into both of the chambers 13a and 13b of the first and second passages a and b, respectively, to rotate the turbine disc 12.

Figure 4:
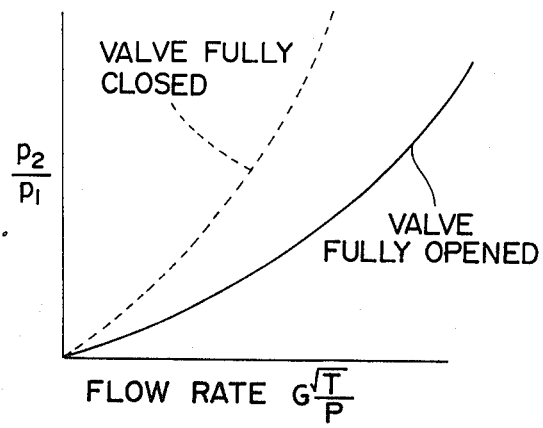
FIG. 4 is a diagram illustrating performance characteristics of the turbo-supercharger.

Conversely, when the rotational speed of the engine is low and the flow rate of exhaust gases is small, the inlet pressure also is low and the electromagnetic actuator 9 is excited to withdraw the rod 9a and rotate the lever 10 clockwise as shown in FIG. 2. That movement closes the valve 7 and the second passage a. Consequently, exhaust gases flow only into the chamber 13b through the second passage b to rotate and drive the turbine disc 12. With the valve 7 closed, the inlet pressure to the second passage b increases, and despite a low flow rate, the pressure ratio remains high as shown by the broken line of FIG. 4 to increase the turbine efficiency n. Thus, a reduction in the rotational speed of the turbine disc 12 is prevented and intake supercharging with high efficiency is achieved.

When the flow rate of exhaust gas is excessively large, the valve 7 is opened and a load is connected to the generator 14. More specifically, electric power generated by the generator 14 is supplied to an electric motor coupled to a crank shaft (not shown) thereby preventing the rotational speed of the turbine disc 12 from being excessively increased. Thus, excessive exhaust energy is converted into electric energy, which is transmitted as a driving torque to a crank shaft of the engine through the motor.

According to the supercharger 1 described above, a convoluted passage defined by the housing portion 4 is divided by the partitioning plate 6 into two passages so as to maintain turbine efficiency during variations in flow rate of exhaust gases. The metal partitioning plate 6 preferably being cast integrally into the turbine housing 26. Therefore, the device is easily manufactured and in addition, the wall thickness of the partitioning plate 6 can be considerably reduced as compared with prior devices in which a partitioning wall is itself cast integrally with a turbine housing. Accordingly, the turbine housing 26 can be of smaller size and the cross-sections of the passages a and b widened to considerably increase turbine efficiency. Furthermore, since the partitioning plate 6 is thin, loss of heat by transmission to the turbine housing 26 through the partitioning plate is considerably reduced.

Obviously, many modifications and variations of the present invention are possible in light of the above teachings. It is to be understood, therefore, that the invention can be practiced otherwise than as specifically described.

What is claimed:

1. An internal combustion engine exhaust energy recovery apparatus comprising:
    a turbine disc;
    a cast turbine housing defining an inlet for connection to an engine exhaust manifold, an exhaust port for discharging exhaust gases, a turbine chamber enclosing said turbine disc, and a convoluted passage extending between said inlet and a periphery of said turbine disc;
    an individual materially distinct partition plate having a peripheral portion cast into said housing and an exposed portion separating said convoluted passage into first and second passages each providing communication between said inlet and said periphery of said turbine disc;
    a valve disposed in said first passage and operable to control the flow of exhaust gases therethrough; and
    an in situ casted thermal insulation plate cast to the inner surfaces of said walls of said housing.

2. An apparatus according to claim 1 wherein said plate has a thickness substantially less than the walls of said housing defining said convoluted passage.

3. An apparatus according to claim 2 wherein said partition plate and said insulation plate are integrally connected before being cast into said turbine housing.

4. An apparatus according to claim 3 including sensor means for sensing the pressure at said inlet, and electrical control means coupled to said valve and said sensor means and operative to control said valve in response to the pressure at said inlet.

* * * * *